US 6,715,293 B2

(12) United States Patent
Sillence et al.

(10) Patent No.: US 6,715,293 B2
(45) Date of Patent: Apr. 6, 2004

(54) SCRAM JET ENGINE DESIGN

(75) Inventors: Mark A. Sillence, Juno Isles, FL (US); Daniel P. Guinan, Hobe Sound, FL (US); Dennis J. Nemecek, Port St. Lucie, FL (US); Costante Salvador, Palm Beach Gardens, FL (US); Henry K. Webster, Jupiter, FL (US); Thomas B. Fortin, Sunrise, FL (US); Sergio Rinella, West Palm Beach, FL (US); Revi K. Nigam, Palm City, FL (US)

(73) Assignee: United Technologies Corporation, Hartford, CT (US)

( * ) Notice: Subject to any disclaimer, the term of this patent is extended or adjusted under 35 U.S.C. 154(b) by 2 days.

(21) Appl. No.: 10/112,635

(22) Filed: Mar. 28, 2002

(65) Prior Publication Data
US 2003/0182928 A1 Oct. 2, 2003

(51) Int. Cl.⁷ .............................. F02K 7/14; F02K 9/64
(52) U.S. Cl. .............................. 60/768; 60/267; 60/767; 166/169
(58) Field of Search ................ 60/267, 266, 768, 60/767, 752; 166/169

(56) References Cited

U.S. PATENT DOCUMENTS

| 2,702,458 | A | * | 2/1955 | Del Mar | 165/169 |
|---|---|---|---|---|---|
| 2,836,379 | A | * | 5/1958 | Salmon | 244/15 |
| 3,358,457 | A | * | 12/1967 | Caldwell et al. | 60/266 |
| 3,535,882 | A | * | 10/1970 | Vizio et al. | 60/768 |
| 3,831,375 | A | * | 8/1974 | Richard et al. | 60/749 |
| 5,116,251 | A | * | 5/1992 | Bichler et al. | 60/768 |
| 5,149,018 | A | * | 9/1992 | Clark | 60/267 |
| 5,452,866 | A | * | 9/1995 | Bulman | 60/265 |
| 6,397,581 | B1 | * | 6/2002 | Vidal et al. | 60/267 |

* cited by examiner

Primary Examiner—Ted Kim
(74) Attorney, Agent, or Firm—Bachman & LaPointe, P.C.

(57) ABSTRACT

The present invention relates to a scram jet engine for use with a hypersonic vehicle. The scram jet engine has an upper boundary wall, a lower boundary wall, and a plurality of side walls defining an inner air flowpath. The walls are formed by a plurality of tubular heat exchanger panels. Each of the heat exchanger panels comprises a plurality of structural panels, each having a plurality of cooling passages, joined together. In the scram jet engine of the present invention, fuel may be used as a coolant and supplied to the cooling passage.

25 Claims, 5 Drawing Sheets

SCRAM JET ENGINE DESIGN

STATEMENT OF GOVERNMENT INTEREST

The Government of the United States of America has rights in this invention, pursuant to Contract No. F33615-96-C-2694 awarded by the United States Department of the Air Force.

BACKGROUND OF THE INVENTION

The present invention relates to a low cost, flight weight scram jet engine and to a heat exchanger panel used in the engine.

Unlike conventional jet engines which have relatively cool fan or compressor air available to cool the engine, a scram jet engine has no such components. Due to its high speed of Mach 5+, any external air brought onboard the engine is too hot to be used as a coolant. To deal with this problem, heat sink scram jet engines use solid copper or steel walls to absorb heat, but are impractical for sustained flight due to their high weight and limited run duration. An alternate solution is to use the engine's fuel as a heat sink. However, despite this solution, there still remains a need for a scram jet engine which better equipped to handle the high heat loads and the associated thermal strains.

SUMMARY OF THE INVENTION

Accordingly, it is an object of the present invention to provide a low cost, flight weight scram jet engine.

It is yet another object of the present invention to provide a scram jet engine as above which is capable of handling high heat loads.

It is still another object of the present invention to provide an improved heat exchanger panel to be used in a scram jet engine.

The foregoing objects are attained by the scram jet engine design of the present invention.

In accordance with the present invention, a scram jet engine broadly comprises an upper boundary wall, a lower boundary wall, and a plurality of side walls defining an inner air flowpath. The upper boundary wall, the lower boundary wall, and the side walls are formed by a plurality of heat exchanger panels. Each heat exchanger panel comprises a plurality of structural panels, each having a plurality of cooling passages, joined together.

Other details of the scram jet engine design of the present invention, as well as other objects and advantages attendant thereto, are set forth in the following detailed description and the accompanying drawings.

DETAILED DESCRIPTION OF THE PREFERRED EMBODIMENT(S)

Figure 1:
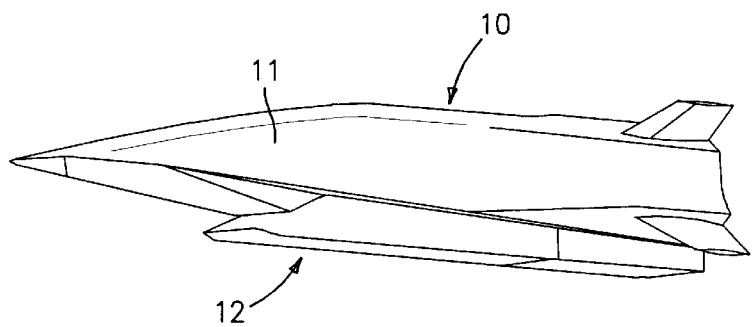
FIG. 1 is a schematic representation of a vehicle having a scram jet engine in accordance with the present invention attached thereto.
Figure 4:
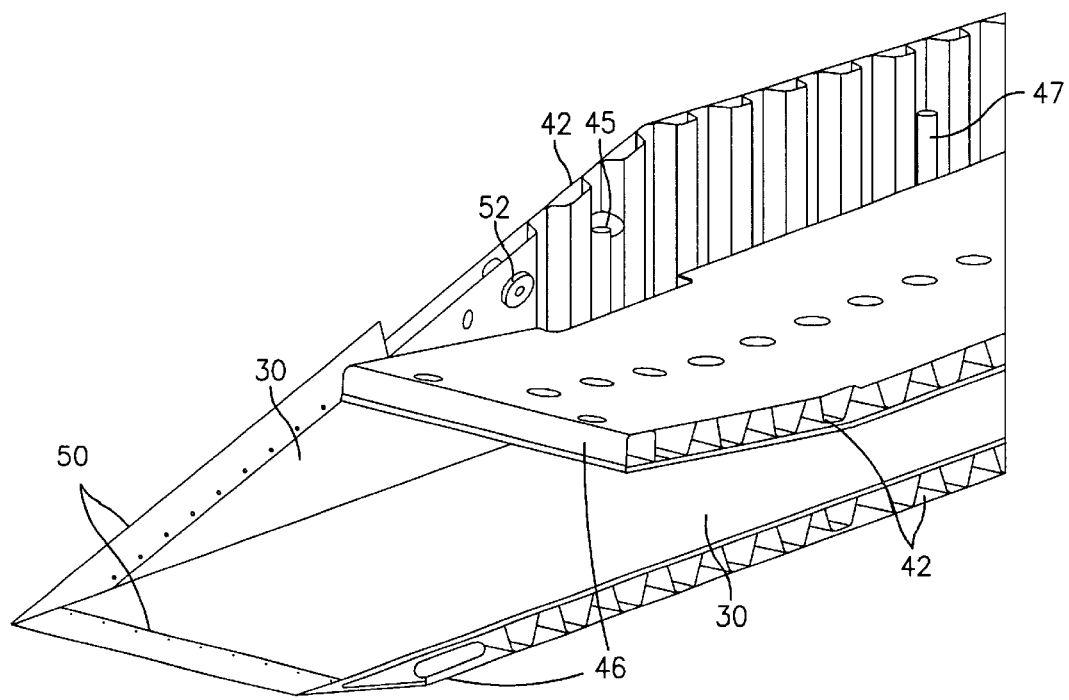
FIG. 4 is a sectional view showing an inlet portion of the scram jet engine of FIG. 2.
Figure 2:
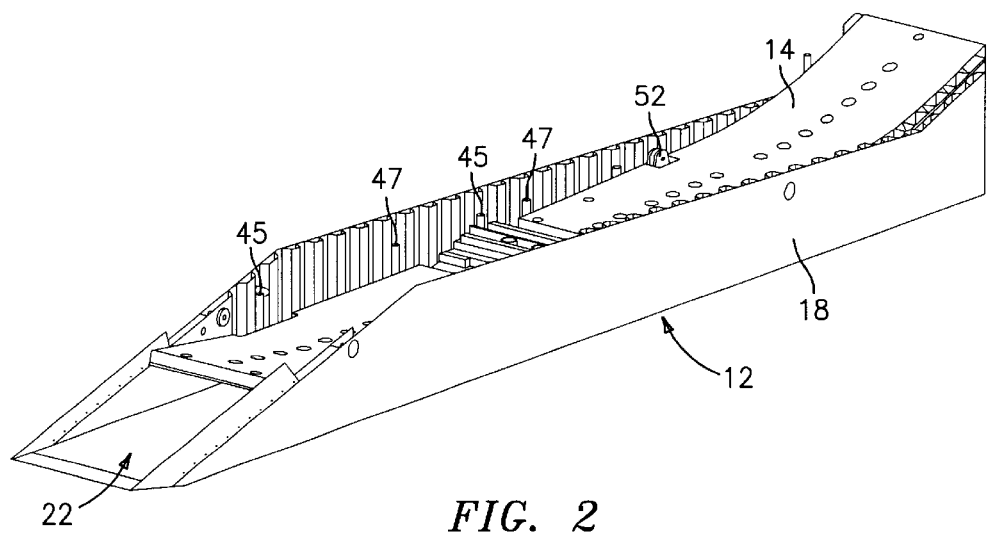
FIG. 2 is a perspective view of a scram jet engine of the present invention.

Referring now to the drawings, FIG. 1 illustrates a hypersonic vehicle 10, which may be a manned or unmanned vehicle or a missile, and a scram jet engine 12 mounted to the vehicle body 11.

The scram jet engine 12 is illustrated in more detail in FIGS. 2–5 and 8. As shown in these figures, the scram jet engine 12 has an upper boundary wall 14, a lower boundary wall 16, and two side walls 18. The walls 14, 16, and 18 define an interior gas flowpath 20. As can be seen from FIGS. 3 and 8, the flowpath 20 includes an inlet region 22, a compression region 24, a pilot region 25, a combustion region 26, and a nozzle region 28.

The upper boundary wall 14, the lower boundary wall 16, and the side walls 18 are formed by a plurality of tubular heat exchanger panels 30 whose inner surfaces 32 are configured to provide the above mentioned regions. The heat exchanger panels 30 may be joined together using any suitable means known in the art. Preferably, adjacent ones of the heat exchanger panels 30 are either welded or bolted together via a flange system.

Figure 6:
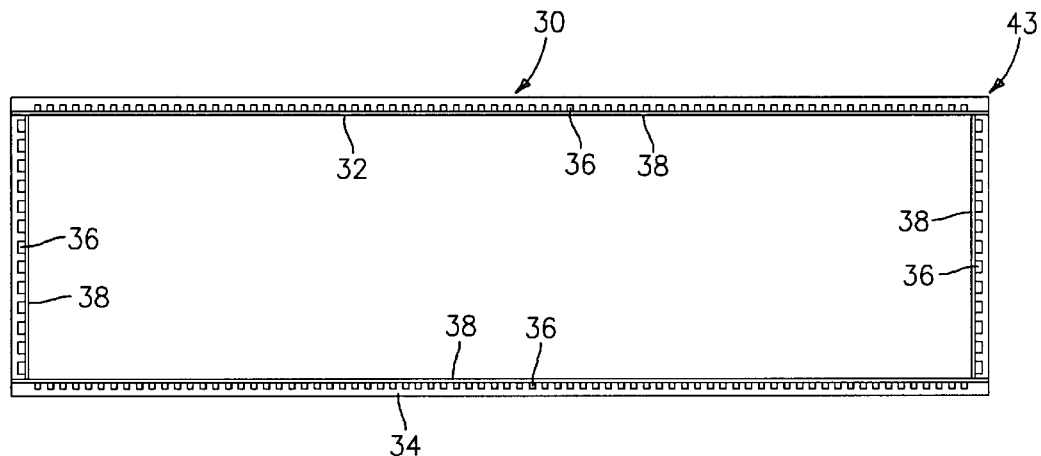
FIG. 6 is a cross sectional view of a heat exchanger panel used in the scram jet engine of the present invention.
Figure 7:
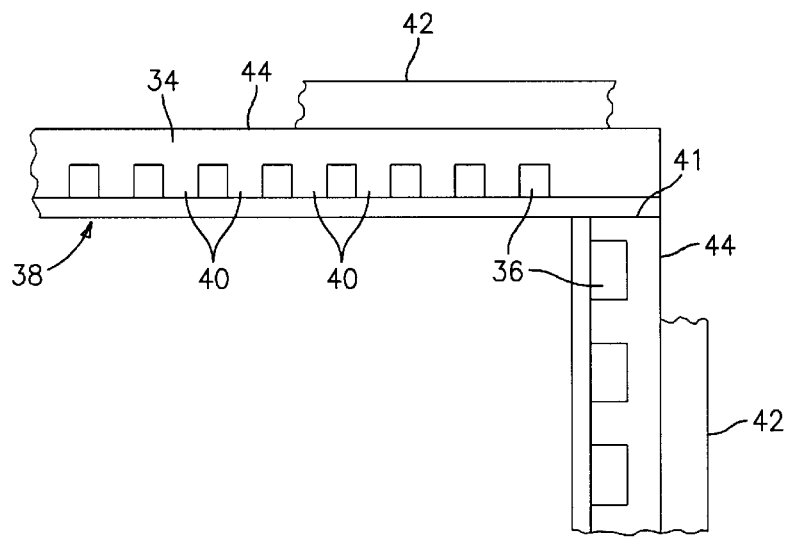
FIG. 7 is an enlarged view of a corner section of the heat exchanger panel of FIG. 6.

As shown in FIGS. 6 and 7, the tubular heat exchanger panels 30 are formed by structural panels 34 which have cooling passages 36. The cooling passages 36 may be water jet milled into the structural panels 34. Further, each of the structural panels 34 has a face sheet 38 joined thereto. Each face sheet 38 is preferably laser welded to a respective one of the structural panels 34 at the lands 40 between the passages 36. While it is preferred to laser weld the face sheet 38 to the structural panels 34, other joining techniques, including, but not limited to, transient liquid phase bonding and vacuum compression brazing, may be used in lieu of the welding.

As shown in FIG. 7, the heat exchanger panel 30 may have corner welds 41 for joining adjacent ones of the structural panels 34 together. The corner weld 41 preferably comprises a single laser weld. The welds 41 seal the internal flowpath gases at each corner 43. This allows close proximity of the cooling passages 36 to the corner joints thus formed.

Figure 9:
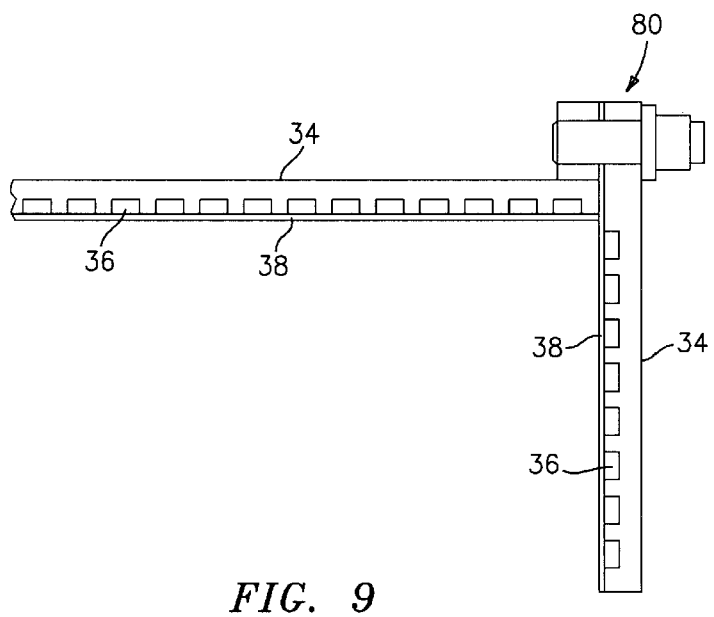
FIG. 9 is an enlarged view of a corner section of an alternative embodiment of a heat exchanger panel.

If desired, a flange and bolt system 80, such as that shown in FIG. 9, may be used to join adjacent ones of the structural panels together.

The structural panels 34 and the face sheets 38 may be made out of any relatively inexpensive, high temperature, high strength, ductile materials with high elongation properties known in the art. For example, the panels 34 and the face sheets 38 may be formed from Inconel 625.

Structural stiffeners 42 may be joined to a surface 44 of one or more of the structural panels 34 for strength purposes. The structural stiffeners 42 may take the form of formed metal sheets identical or similar in properties to the material forming the panels 34. The structural stiffeners 34 may be joined to the panel(s) 34 using any suitable technique known in the art, preferably welding or brazing.

Each heat exchanger panel 30 further includes integral inlet and outlet manifolds 46 and 48 respectively. The inlet manifold 46 receives fuel via conduits 45 which is then passed through the passages 36 to act as a coolant. The heated fuel is then received into the outlet manifold 48 where it is returned through conduits 47 to a fuel reservoir or tank (not shown). The heated fuel is eventually feed to the pilot region 25. While the inlet manifold 46 has been shown as being at the leading edge of a heat exchanger panel 30 and the outlet manifold 48 has been shown as being at the trailing edge of the panel 30, the inlet and outlet manifolds 46 and 48 could be located elsewhere in the panel 30. For example, the inlet manifold 46 may be at the trailing edge of the panel 30 and the outlet manifold 48 may be at the leading edge of the panel 30. Alternatively, the manifolds 46 and 48 may both be located in an interior portion of the panel 30.

The engine 12 further has leading edge members 50. The leading edge members preferably are formed from a composite material such as a carbon-carbon composite (carbon fibers in a carbon matrix) or a carbon-silicon carbide composite (carbon fibers in a silicon carbide matrix). Such leading edge members 50 run uncooled and thus provide a mechanically simpler solution to handling high stagnation temperatures than actively cooled metallic leading edges. However, actively cooled metallic leading edges may be used for the leading edge members 50 if desired.

The engine further has engine mounts 52 for mounting the scram jet engine 12 to the vehicle body 11. Any suitable means known in the art may be used to secure the scram jet engine 12 to the vehicle 10 via the mounts 52.

During operation of the scram jet engine 12, air enters the inlet region 22 and is compressed in the compression region 24 as a result of the converging flow path in this region. The compressed air then flows to the pilot region 25 where fuel is injected into the air. Any suitable means known in the art may be used to inject fuel into the air in the pilot region 25. The fuel is then ignited in the combustion region 26. At high speeds, the fuel will self-ignite. At lower speeds, one or more ignitors (not shown) positioned in the combustion region 26 may be used to ignite the fuel-air mixture. In the nozzle region 28, pressurized air is exhausted from the engine 12 to generate thrust.

Figure 3:
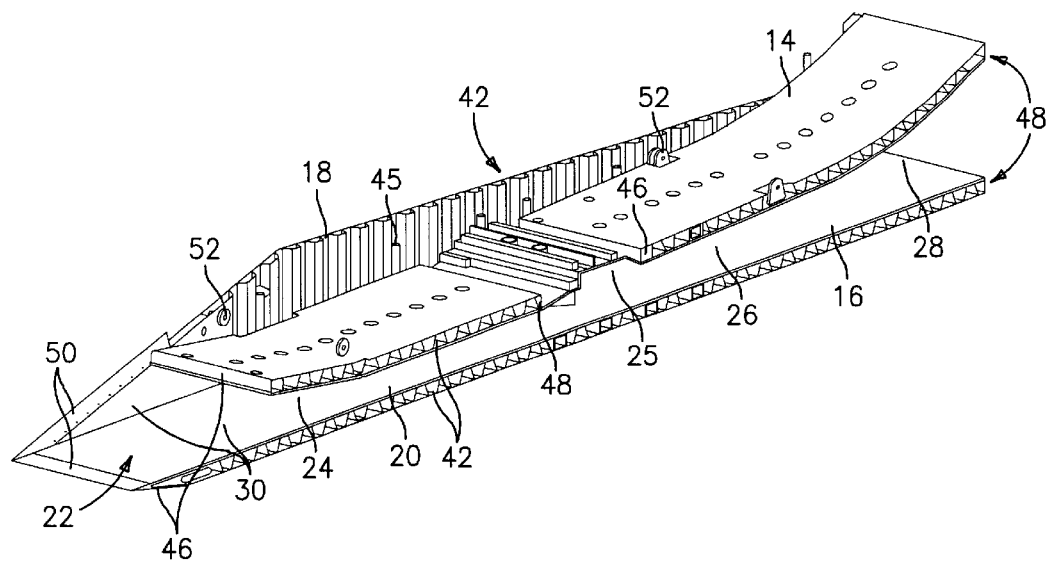
FIG. 3 is a sectional view of the scram jet engine of FIG. 2.
Figure 5:
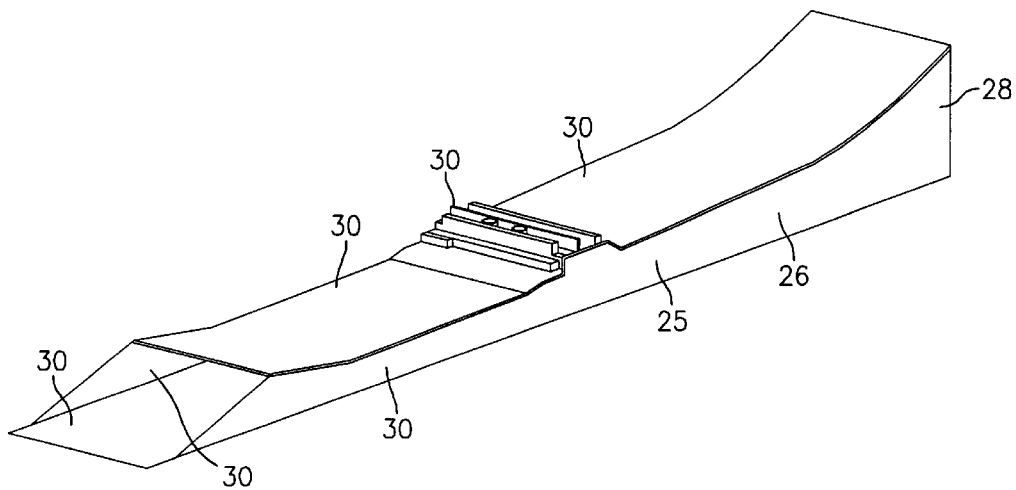
FIG. 5 is a schematic representation of the inner flow path of the scram jet engine of FIG. 2.
Figure 8:
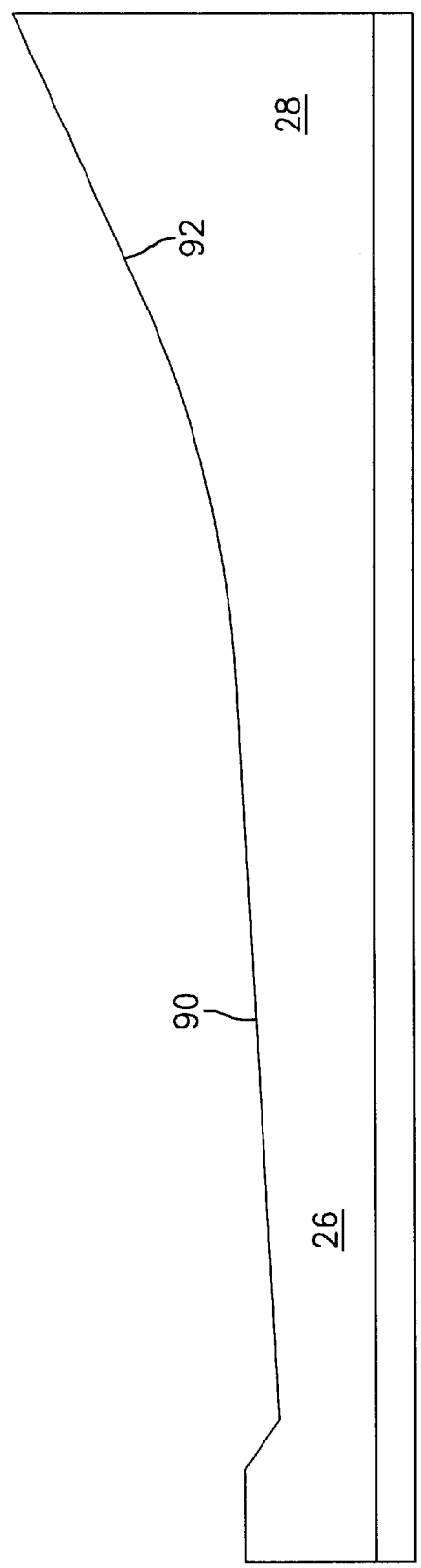
FIG. 8 is a sectional view of the combustion and nozzle regions of the scram jet engine of FIG. 1.

As can be seen from FIGS. 3, 5 and 8, the combustion region 26 and the nozzle region 28 have simplified flow path contours which use straight line 90 and circular arc 92 sections to approximate parabolic curves.

The scram jet engine of the present invention may be used with a wide variety of vehicles. For example, the scram jet engine may be used to power a missile.

The scram jet engine of the present invention is advantageous in that it is lightweight and may be constructed at a relatively low cost. This latter advantage is due to the fact that the scram jet engine is constructed of relatively inexpensive, commercially available materials and does not require tight dimensional control.

It is apparent that there has been provided in accordance with the present invention a scram jet engine design which fully satisfies the objects, means, and advantages set forth hereinbefore. While the present invention has been described in the context of specific embodiments thereof, other alternatives, modifications and variations will become apparent to those skilled in the art having read the foregoing description. Accordingly, it is intended to embrace those alternatives, modifications, and variations as fall within the broad scope of the appended claims.

What is claimed is:

1. A scram jet engine comprising:
   an upper boundary wall, a lower boundary wall, and a plurality of side walls defining an inner air flowpath;
   said upper boundary wall, lower boundary wall, and side walls being formed by a plurality of tubular heat exchanger panels;
   each said heat exchanger panel comprising a plurality of structural panels joined together;
   each said structural panel comprising a panel with a planar outer surface and an inner surface formed by a plurality of cooling passages separated by a plurality of lands, a face sheet, joined to each of said structural panels at said lands, and a structural stiffener positioned adjacent to and joined to said outer surface; and
   each said structural panel having a separate inlet manifold and a separate outlet manifold communicating with said cooling passages.

2. A scram jet engine according to claim 1, wherein each said face sheet is welded to a respective one of said structural panels at lands between said cooling passages of said respective one of said structural panels.

3. A scram jet engine according to claim 1, wherein each said face sheet is joined to a respective one of said structural panels by vacuum compression brazing.

4. A scram jet engine according to claim 1, wherein each said face sheet is joined to a respective one of said structural panels by transient liquid phase bonding.

5. A scram jet engine according to claim 1, wherein each said structural panel is welded to each adjacent structural panel by a single weld.

6. A scram jet engine according to claim 5, wherein each said single weld is located in a corner of said heat exchange panel.

7. A scram jet engine according to claim 1, wherein each said structural panel is joined to each adjacent structural panel by a flange and bolt system.

8. A scram jet engine according to claim 1, wherein said structural stiffeners are formed from sheet metal and are joined to said heat exchanger panels by welding or brazing.

9. A scram jet engine according to claim 1, further comprising means for supplying fuel to said inlet manifold and for removing heated fuel from said outlet manifold.

10. A scram jet engine according to claim 1, further comprising leading edge members attached to said heat exchanger panels.

11. A scram jet engine according to claim 10, wherein each said leading edge member is formed from a composite material.

12. A scram jet engine according to claim 11, wherein said composite material is selected from the group consisting of a carbon-carbon composite material and a carbon-silicon carbide composite.

13. A scram jet engine according to claim 10, wherein each said leading edge member is formed by an actively cooled metallic leading edge member.

14. A scram jet engine according to claim 1, wherein said heat exchanger panels are welded together to form an inlet region, a compression region, a pilot region, a combustion region, and a nozzle region.

15. A scram jet engine according to claim 14, further comprising means for supplying fuel to said pilot region.

16. A scram jet engine comprising:
   an upper boundary wall, a lower boundary wall, and a plurality of side walls defining an inner air flowpath;
   said upper boundary wall, lower boundary wall, and side walls being formed by a plurality of tubular heat exchanger panels;
   each said heat exchanger panel comprising a plurality of structural panels joined together;

each said structural panel having a plurality of cooling passages;

said heat exchanger panels being welded together to form an inlet region, a compression region, a pilot region, a combustion region, and a nozzle region; and said combustion region and said nozzle region have having contours which approximate parabolic curves.

17. A heat exchanger panel for use in a scram jet engine comprising:

a plurality of structural panels, each having a plurality of coolant passages machined therein and a separate inlet manifold and a separate outlet manifold communicating with said coolant passages;

each said structural panel having said coolant passages being separated by a plurality of lands which form an inner surface, and a planar outer surface;

a face sheet welded to said plurality of lands and a structural stiffener formed from sheet metal positioned adjacent to and joined to said outer surface; and said structural panels being arranged to form a tubular structure which defines an inner air flowpath for said scram jet engine and said panels being joined together.

18. A heat exchanger panel according to claim 17, wherein each said structural panel is welded to adjacent structural panels by a single laser weld in a corner of said tubular structure.

19. A heat exchanger panel according to claim 17, wherein each said structural panel and each said face sheet is formed from a high temperature, high strength, ductile metallic material.

20. A hypersonic vehicle having a scram jet engine for propulsion, said scram jet engine comprising:

an inlet region, a compression region, a pilot region, a combustion region, and a nozzle region;

said regions being formed by a plurality of tubular heat exchanger panels; each said tubular heat exchanger panel being formed by a plurality of joined together structural panels;

each said structural panel having a plurality of cooling passages for receiving fuel and using said fuel to cool air flowing through said regions;

each said structural panel having said cooling passages separated by a plurality of lands which form an inner surface and communicating with a separate inlet manifold and a separate outlet manifold, and having a planar surface;

a face sheet welded to said plurality of lands; and a structural stiffener formed from sheet metal positioned adjacent to and joined to said outer surface of each said structural panel.

21. A hypersonic vehicle according to claim 20, wherein said vehicle is a missile.

22. A hypersonic vehicle according to claim 20, further comprising a composite leading edge attached to said inlet region.

23. A hypersonic vehicle according to claim 22, further comprising said composite leading edge being formed from a material selected from the group consisting of a carbon-carbon composite material and a carbon-silicon carbide composite material.

24. A hypersonic vehicle according to claim 20, further comprising said vehicle having a body and said scram jet engine has mounting means for mounting said scram jet engine to said body.

25. A hypersonic vehicle according to claim 20, further comprising actively cooled leading edge members attached to said inlet region.

* * * * *

UNITED STATES PATENT AND TRADEMARK OFFICE
CERTIFICATE OF CORRECTION

PATENT NO. : 6,715,293 B2  Page 1 of 1
APPLICATION NO. : 10/112635
DATED : April 6, 2004
INVENTOR(S) : Mark A. Sillence et al.

It is certified that error appears in the above-identified patent and that said Letters Patent is hereby corrected as shown below:

In column 6, line 11, after "planar", insert --outer--.

Signed and Sealed this

Eighth Day of August, 2006

JON W. DUDAS
*Director of the United States Patent and Trademark Office*